(12) United States Patent
Ocegueda-Hernandez et al.

(10) Patent No.: US 11,454,586 B2
(45) Date of Patent: Sep. 27, 2022

(54) REAL-TIME BREAKOVER DETECTION DURING PICKUP WEIGHT STEP FOR FRICTION TEST USING MACHINE LEARNING TECHNIQUES

(71) Applicant: National Oilwell Varco, L.P., Houston, TX (US)

(72) Inventors: Francisco Ocegueda-Hernandez, Houston, TX (US); Ricardo Vilalta, Katy, TX (US)

(73) Assignee: National Oilwell Varco, L.P., Houston, TX (US)

( * ) Notice: Subject to any disclaimer, the term of this patent is extended or adjusted under 35 U.S.C. 154(b) by 328 days.

(21) Appl. No.: 16/869,965

(22) Filed: May 8, 2020

(65) Prior Publication Data
US 2020/0363316 A1     Nov. 19, 2020

Related U.S. Application Data

(60) Provisional application No. 62/848,965, filed on May 16, 2019.

(51) Int. Cl.
| | | |
|---|---|---|
| *G01N 19/02* | (2006.01) | |
| *G06N 20/20* | (2019.01) | |
| *G01N 3/56* | (2006.01) | |
| *G08B 21/18* | (2006.01) | |
| *G06F 17/18* | (2006.01) | |
| *G06F 17/12* | (2006.01) | |

(52) U.S. Cl.
CPC .............. *G01N 19/02* (2013.01); *G01N 3/56* (2013.01); *G06F 17/12* (2013.01); *G06F 17/18* (2013.01); *G06N 20/20* (2019.01); *G08B 21/182* (2013.01); *G08B 21/187* (2013.01)

(58) Field of Classification Search
CPC .......... G01N 19/02; G01N 3/56; G06F 17/12; G06F 17/18; G06N 20/20; G06N 7/005; G06N 20/00; G08B 21/82; G08B 21/187; E21B 44/02
See application file for complete search history.

(56) References Cited

U.S. PATENT DOCUMENTS

| | | | | |
|---|---|---|---|---|
| 2006/0277973 | A1* | 12/2006 | Bailey | G01N 19/02 73/9 |
| 2007/0169539 | A1* | 7/2007 | Fujii | G01N 19/02 356/450 |

(Continued)

*Primary Examiner* — Ojiako K Nwugo
(74) *Attorney, Agent, or Firm* — Blank Rome LLP

(57) ABSTRACT

Detecting a breakover event during a friction test includes obtaining a hookload measurement for each of a series of time windows and generating a linear model and a nonlinear model from the plurality of hookload measurements. During run time, from the nonlinear model, an inflection point is identified from the nonlinear model, where the inflection point is determined to have occurred at a particular time window. A hookload value associated with the linear model, and a hookload value associated with the nonlinear model is determined for the particular time window. A breakover event is determined to have occurred at the particular time when the hookload value associated with the linear model at the particular time window exceeds the hookload value associated with the nonlinear model at the particular time window.

20 Claims, 6 Drawing Sheets

(56) References Cited

U.S. PATENT DOCUMENTS

| | | | | |
|---|---|---|---|---|
| 2008/0060411 | A1* | 3/2008 | Schleif | G01N 19/02 73/9 |
| 2008/0156067 | A1* | 7/2008 | Lin | G01N 19/02 73/9 |
| 2009/0107210 | A1* | 4/2009 | Arnold | G01N 19/02 73/9 |
| 2012/0240660 | A1* | 9/2012 | Johnson | G01N 35/00693 73/9 |
| 2014/0202230 | A1* | 7/2014 | Graflind | B60T 8/172 73/9 |
| 2015/0293001 | A1* | 10/2015 | Werner | G01N 29/04 73/7 |
| 2016/0116395 | A1* | 4/2016 | Gardiner | B60T 8/172 73/9 |
| 2018/0321216 | A1* | 11/2018 | Hamer | G01N 11/16 |
| 2019/0154557 | A1* | 5/2019 | Nagasue | G01N 3/58 |

\* cited by examiner

REAL-TIME BREAKOVER DETECTION DURING PICKUP WEIGHT STEP FOR FRICTION TEST USING MACHINE LEARNING TECHNIQUES

BACKGROUND ART

Embodiments described herein generally relate to automated drilling, and more specifically to real-time breakover detection using machine learning techniques.

Oilfield operations may be performed to locate and gather valuable downhole fluids. Oil rigs are positioned at wellsites, and downhole tools, such as drilling tools and other components, are deployed into the ground to reach subsurface reservoirs. Traditionally, human operators will need to press dozens of buttons in order to operate rig equipment to complete the drilling process. In addition, although a human operator may be relying on feedback provided by the downhole tools, drilling operations controlled by human operation may lack consistency, or may be subject to human error. Further, while some drilling applications allow for a software-based management of drilling operations, they often require the application developer to be keenly aware of the particulars of a rig, such as specific tools, and language needed to drive those tools.

An example of this is the detection of a breakover event during a friction test activity. The friction test is a procedure to gather measurements critical to assess oil-well conditions during drilling. The pickup weight step on this test measures the drillstring weight, a.k.a hookload, during the transition from static friction to kinetic friction when the drill string is hoisted up from rest, also referred to as a breakover event. Typically, predicting a breakover event requires the driller to monitor a hookload signal over time to identify a pattern in the hookload signal. The challenge behind the automation of breakover detection is due to a changing pattern that depends on the well condition. Moreover, such a pattern is easily observed when the graph is populated with data. In the real-time friction test operation, however, we can only observe data until a certain time t; a prediction then needs to be made in real-time as to the status of the operation. Hence, the prediction is more challenging because of limited, real-time data. If the breakover is signaled before it actually occurs, a costly false positive prediction may occur. If a breakover event is missed, a false negative prediction may similarly affect drilling efficiency. Presently, an algorithm is used that implements a cumulative max technique to determine that a maximum last at least a certain amount of time in order to predict when a breakover event occurred with high confidence. However, the algorithm is prone to false positive errors when the time window size is not long enough, or false negative errors when the time window size is too long. What is needed is an improved technique for automatically detecting breakover events in real time.

DESCRIPTION OF EMBODIMENTS

Figure 1:
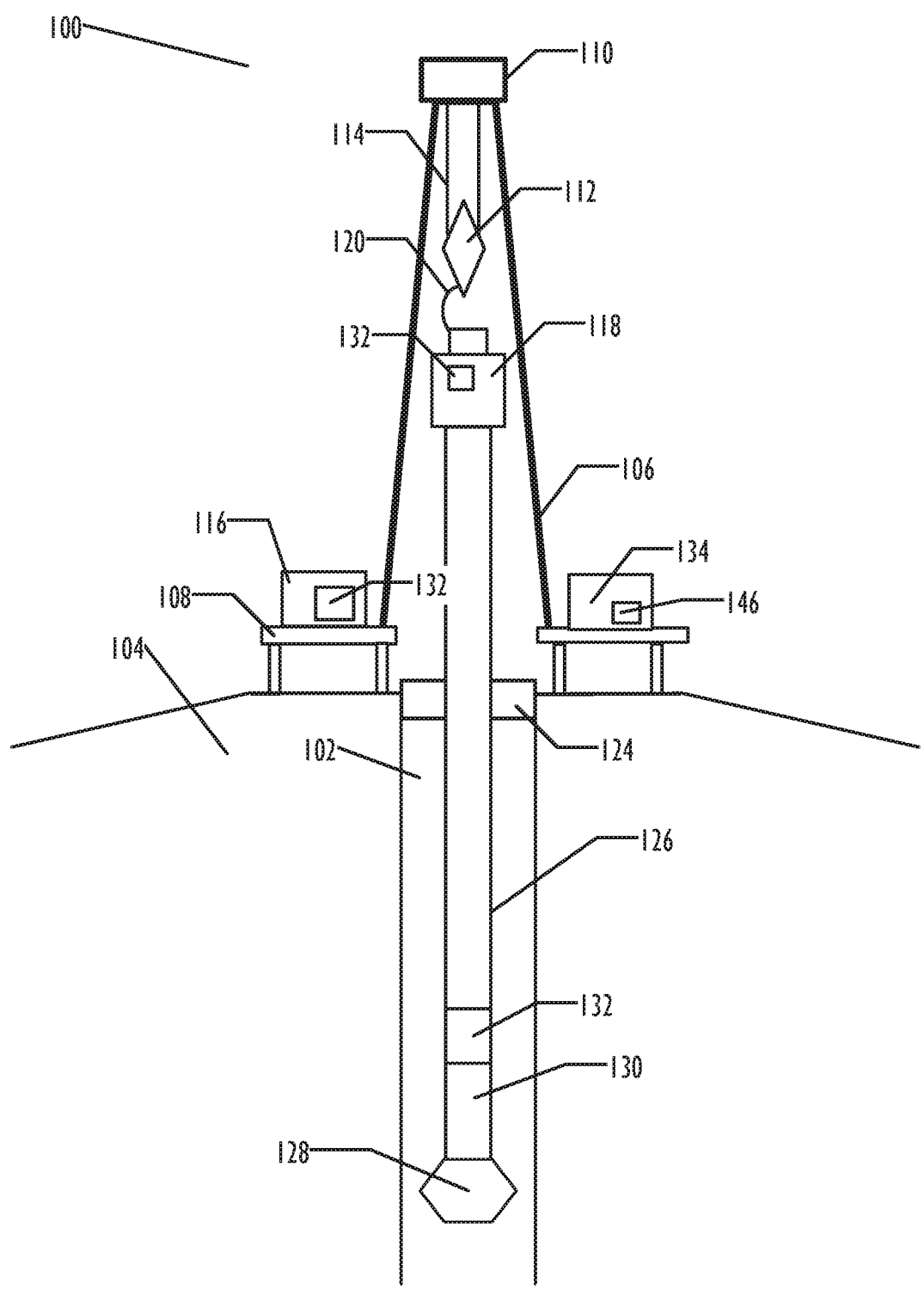
FIG. 1 is a diagram illustrating an apparatus for performing automated drilling operations utilizing a drilling rig software system.

In general, the following description is directed to detecting a breakover event during a friction test includes obtaining a hookload measurement for each of a series of time windows and generating a linear model and a nonlinear model from the plurality of hookload measurements. During run time, from the nonlinear model, an inflection point is identified from the nonlinear model, where the inflection point is determined to have occurred at a particular time window. A hookload value associated with the linear model, and a hookload value associated with the nonlinear model is determined for the particular time window. A breakover event is determined to have occurred at the particular time when the hookload value associated with the linear model at the particular time window exceeds the hookload value associated with the nonlinear model at the particular time window.

According to one or more embodiments, a hookload value may be captured for a series of time windows. A linear model may be fit to the hookload data to identify when the hookload has stabilized. In one or more embodiments, a small slope of the linear model, such as a slope below a slope threshold, may indicate that the hookload has entered into a stable configuration and is mostly flat. However, there can be variations in the slope of the linear model at the local level that may cause the early prediction of a breakover event. The technique may be improved by also considering a nonlinear model.

A linear model captures the overall direction of the data. As more examples are observed, one would expect the slope to be reduced, especially when the region of stability is reached and the hookload values remain stable. A nonlinear model may be fit to the hookload data to identify an inflection point at which time the curve is determined to change direction. One type of nonlinear model which may be utilized is a dose-response curve ("DRC"). A DRC model is utilized in the medical field as a graph that relates a stressor to an organism consuming the stressor, such as pollutants or drugs. In one or more embodiments, when the linear model crosses the inflection point above the hookload value of the nonlinear model, a stable region may be determined to be reached. As such, a breakover event can be identified.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of automated drilling having the benefit of this disclosure.

As used herein, the term "programmable device" can refer to a single programmable device or a plurality of programmable devices working together to perform the function described as being performed on or by the programmable device.

As used herein, the term "medium" refers to a single physical medium or a plurality of media that together store what is described as being stored on the medium.

As used herein, the term "network device" can refer to any programmable device that is capable of communicating with another programmable device across any type of network.

As used herein, the term "drilling rig" can refer to a land or offshore rig apparatus utilized to drill a borehole.

As used herein, the term "drilling tool" can refer to drilling components such as drilling devices or sensors utilized to perform drilling activities.

As used herein, the term "hookload" comprises a sum of all weights exerted on a hook during a friction test.

In one embodiment of the invention, as illustrated in FIG. 1, an apparatus 100 for automated drilling of a borehole 102 in a subsurface formation 104 includes a derrick 106 on a rig floor 108. A crown block 110 is mounted at the top of the derrick 106, and a traveling block 112 hangs from the crown block 110 by means of a cable or drilling line 114. One end of the cable or drilling line 114 is connected to drawworks 116, which is a reeling device operable to adjust the length of the cable or drilling line 114 so that the traveling block 112 moves up and down the derrick 106. A top drive 118 is supported on a hook 120 attached to the bottom of the traveling block 112. The top drive 118 is coupled to the top of a drill string, which extends through a wellhead 124 into the borehole 102 below the rig floor 108. The top drive 118 is used to rotate the drill string inside the borehole 102 as the borehole 102 is being drilled in the subsurface formation 104. A bottomhole assembly 126 is provided at the bottom of the drill string. The bottomhole assembly 126 includes a bit 128 and a downhole motor 130 and may include other components not specifically identified but known in the art, e.g., a sensor package.

Although not shown, the automated drilling apparatus 100 includes a mud tank, which contains drilling fluid or "mud," a mud pump for transferring the drilling fluid to a mud hose, and a mud treatment system for cleaning the drilling fluid when it is laden with subsurface formation cuttings. The mud hose, in use, would be fluidly connected to the drill string so that the drilling fluid can be pumped from the mud tank into the drill string. The drilling fluid would be returned to the mud treatment system via a return path between the borehole and the drill string or inside the drill string, i.e., if the drill string is a dual-bore drill string. After the drilling fluid is cleaned in the mud treatment system, the clean drilling fluid would be returned to the mud tank.

In one embodiment of the invention, the automated drilling apparatus 100 includes sensors (or instruments) 132 for measuring drilling data. A variety of drilling data may be measured by the sensors 132. The locations of the sensors in the automated drilling apparatus 100 and the types of sensors 132 will be determined by the drilling data to be measured by the sensors 132. Examples of drilling data that may be measured by the sensors 132 include, but are not limited to, weight on bit, bit or drill string rotational speed, drill string rotational torque, rate of penetration, and drilling fluid flow rate. Measuring of drilling data may be direct or indirect. In the indirect measurement, the desired drilling data may be derived from other measurable drilling data. The drilling data may be measured at the surface and/or in the borehole. For example, drill string rotational torque may be measured at the surface using a sensor 132 on the top drive 118. Alternatively, differential pressure across the downhole motor 130 may be measured using a sensor 132 downhole. In another example, the load on hook 120 may be measured using any suitable means at the surface, and weight on bit may be inferred from the hookload. Various other drilling data not specifically mentioned above may be measured, or derived, as required by the drilling process.

In one embodiment, the drilling apparatus 100 includes one or more rig computing systems, such as rig computing system 134. In one embodiment, the rig computing system 134 includes various computing components and peripherals, such as a processor, memory, a display, a communications interface, and an input interface. The rig computing system 134 can receive measurement of drilling data from the various sensors 132 of the automated drilling apparatus 100. Information related to operation of the rig computing system 134 may be stored in some other computer-readable media 146 for subsequent loading into memory. Although the rig computing system 134 is shown primarily at the surface in FIG. 1, it should be noted that in other embodiments of the invention a portion or all of the rig computing system 134 may be located downhole.

Figure 2:
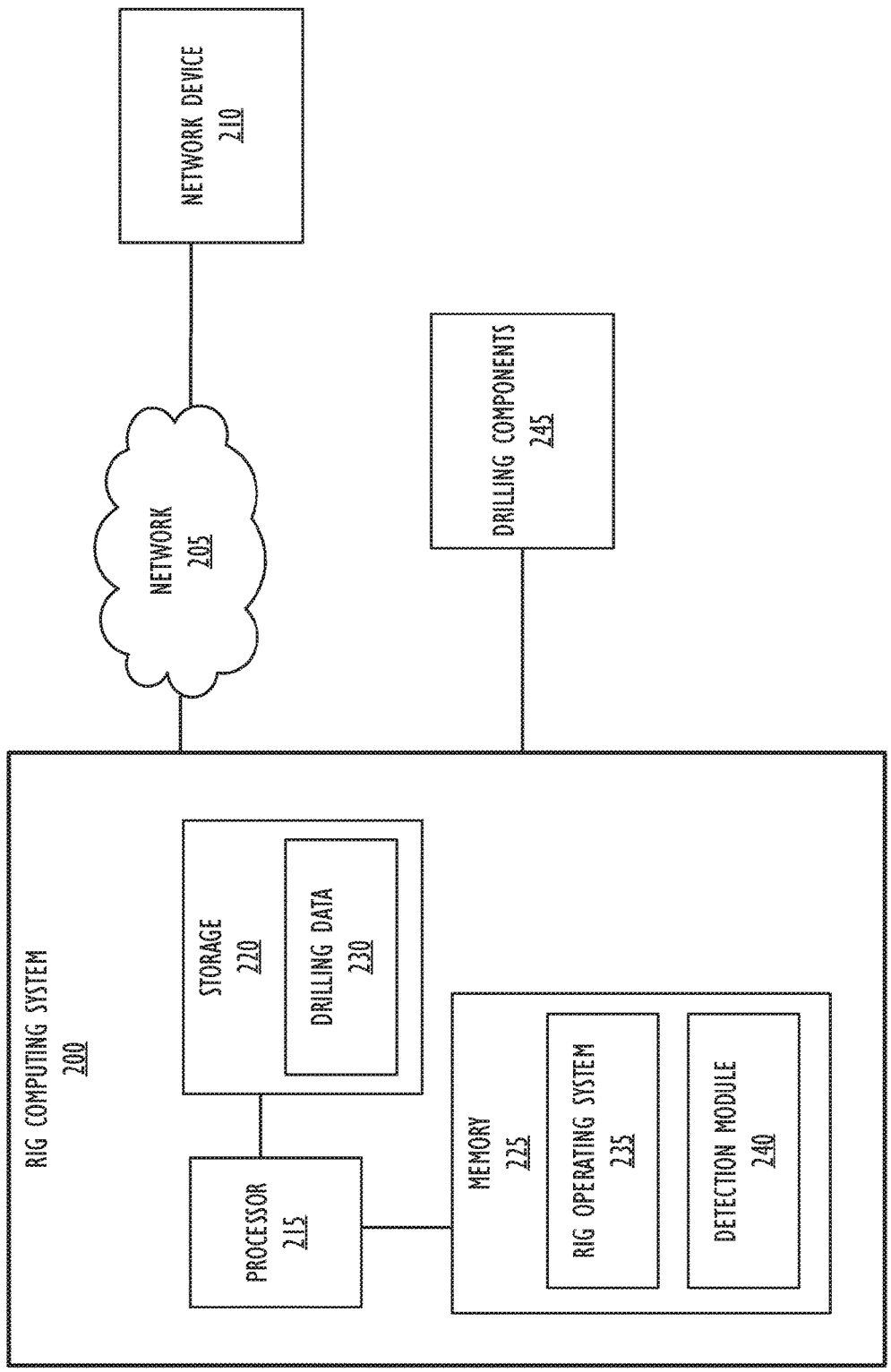
FIG. 2 is a system diagram illustrating a drilling rig software system for automated drilling, including a detection module.

FIG. 2 depicts a system diagram illustrating a drilling rig software system for automated drilling. FIG. 2 includes a rig computing system 200 connected to one or more network devices 210 across a network 205. Rig computing system 200 may be, for example, a detailed version of rig computing system 134 of FIG. 1. Network device 210 may include any kind of device accessible across network 205, with which rig computing system 200 may communicate. For example, network device 210 may be an additional rig computing system, a server, a remote computer, or the like. Network 205 may include many different types of computer networks available today, such as the Internet, a corporate network, a Local Area Network (LAN), or a personal network, such as those over a Bluetooth connection. Each of these networks can contain wired or wireless programmable devices and operate using any number of network protocols (e.g., TCP/IP). Network 205 may be connected to gateways and routers, servers, and end user computers.

According to one or more embodiments, rig computing system 200 may include, for example, a storage 220, a memory 225 and processor 215. Processor 215 may include a single processor or multiple processors. Further, in one or more embodiment, processor 215 may include different kinds of processors, such as a central processing unit ("CPU") and a graphics processing unit ("GPU"). Memory 225 may include a number of software or firmware modules executable by processor 215. Memory 225 may include a single memory device or multiple memory devices. As depicted, memory 225 may include a rig operating system 235 and detection module 240. The rig operating system 235 may be a process automation platform that manages rig equipment to execute operations such as a friction test in which a data is monitored for breakover event detection by detection module 240. In one or more embodiment, the rig operating system 235 may receive instructions from the detection module 240 and coordinate the instructions with the drilling components 245 to implement the well plan, such as the friction test. The well plan may include a set of event-driven drilling activities that make up one or more drilling processes. In one or more embodiments, the detection module 240 may be utilized to more efficiently implement the drilling processes.

In one or more embodiments, the detection module 240 may monitor sensor data to determine hookload during a friction test. The rig operating system 235 may deploy the various drilling activities in a drilling process. While the drilling activities are performed, the detection module 240 may monitor drilling data, such as data from sensors of drilling components 245. The detection module 240 may utilize the drilling data to identify trigger signatures which may better identify an event that triggers a next drilling activity in a drilling process. According to one or more embodiments, the detection module 240 may monitor hookload measurements over a series of time intervals to determine when a criterion is met that indicates a breakover event has occurred.

According to one or more embodiments, the detection module 240 may utilize a machine learning algorithm which considers the monitored sensor data to determine when a breakover event has occurred while a friction test is being implemented. According to one or more embodiments, by utilizing a machine learning algorithm, the breakover event may be determined regardless of geological characteristics of a particular well. A breakover event is typically detected in response to determining that a hookload measurement has stabilized after seeing a peak followed by a slight decline.

The detection module 240 may analyze the drilling data as it is collected to determine whether a breakover event has occurred. In one or more embodiments, the detection module 240 may capture hookload measurements over time. The detection module 240 may obtain a representative hookload measurement for each of a progressive series of time intervals. The representative hookload measurement may be, for example, a maximum hookload during the time interval, an average hookload during the time interval, or the like. The detection module 240 may obtain the representative hookload measurements over time as the hookload measurements are captured. In one or more embodiments, the hookload measurements may be plotted across time to obtain a set of hookload measurements.

According to one or more embodiments, the hookload measurement indicates a sum of all weight exerted on a hook during a friction test. When the hookload measurements are considered over time during the pickup weight step, a signature pattern for a breakover event will emerge in the hookload measurements, such as a peak value, followed by a small decline and a stabilization of hookload measurements over time. The detection module 240 analyzes the pattern of the hookload measurements over time, in real time, to efficiently detect the occurrence of a breakover event.

While hookload measurements are obtained, the detection module 240 may analyze the hookload measurements to determine a linear model and a nonlinear model of the hookload values. The linear model and nonlinear model may be obtained, for example, upon receiving each hookload measurement, upon determining each representative hookload measurement (such as after each time interval), periodically after a particular number of time intervals are completed, or the like. As such, the linear model and the nonlinear model for the hookload may dynamically change as additional hookload measurements are obtained. Upon determining a linear model and a nonlinear model for a hookload values, the detection module 240 may determine if a breakover event criterion is met. In one or more embodiments, the breakover criterion may be determined to be met by identifying an inflection point in the current nonlinear model. The inflection point may indicate a point at which the curve of the nonlinear model is determined to change direction. A hookload value at the inflection point is determined from the nonlinear model. In addition, a hookload value from the linear model is obtained corresponding to the same time window at which the inflection point is identified. If the hookload value associated with the inflection point of the nonlinear model is less than the hookload value from the linear model for the same time frame, the breakover criterion is considered to be met and a breakover event is determined to have occurred.

The result of utilizing a machine learning technique is that the detection module 240 may detect that a breakover event has occurred while performing a friction test with minimal to no borehole-specific configurations. That is, while alternative techniques typically require knowledge of characteristics of a particular borehole to detect a breakover event, the described technique does not. As such, the described technique does not require tracking time down, a deviation threshold, time for stability, or maximum hoisting distance.

The detection module 240 may receive the data through the rig operating system 235, or may be part of the rig operating system 235. In one or more embodiments, the detection module 240 may detect that a breakover event has occurred during a friction test. In one or more embodiments, the detection module 240 may utilize hookload measurements during a friction test, which may include capturing drilling data. Drilling data 230 may be stored, for example, in storage 220. Alternatively, or additionally, drilling data and historic data may be stored in network storage, such as network device 210 across network 205. Although the various components are depicted within a single computing device rig computing system 200, in one or more embodiments, the various components and functionalities described with respect to the rig computing system 200 may instead be reconfigured in a different combination, or may be distributed among multiple computing devices.

Figure 3:
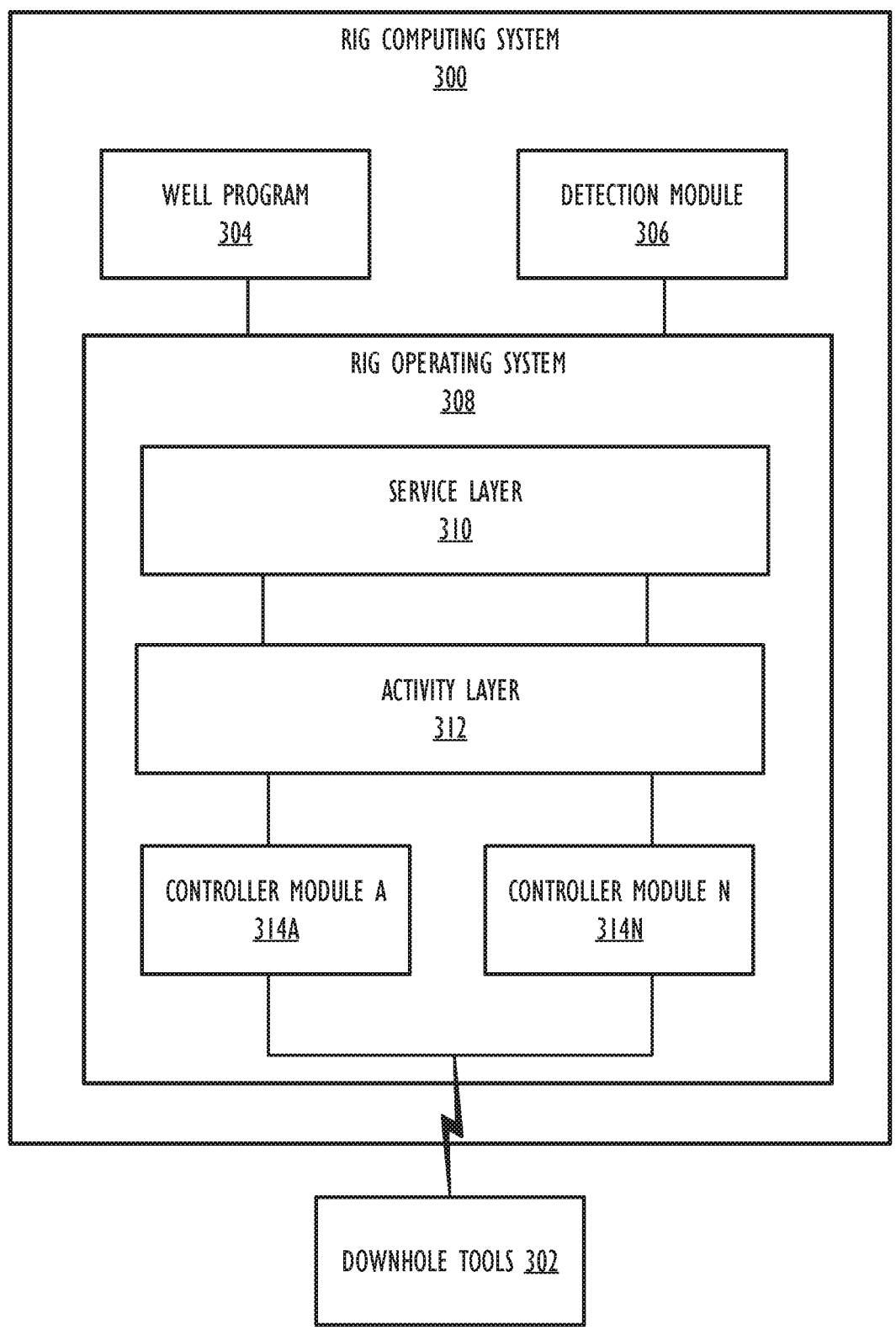
FIG. 3 is a flow diagram illustrating components of a rig computing system.

Turning to FIG. 3, a flow diagram illustrating components of a rig computing system. Specifically, FIG. 3 provides a schematic of an example data flow within the rig computing system 300. The rig computing system 300 may include detection module 306, and a rig operating system 308. In addition, the rig computing system 300 may include a well program 304, which may facilitate management of the rig. The rig operating system may include several layers in which data flows. The rig operating system 308 may receive instructions from the detection module 306. The detection module 306 may provide tool-agnostic instructions. That is, detection module 306 may be written for generic drilling components, and the rig operating system 308 may translate the tool-agnostic instructions into tool-specific instructions, to direct the specific downhole tools 302 accessible by the rig computing system 300. In one or more embodiments, multiple drilling applications, such has well program 304 and detection module 306 may be utilized during a drilling process. The drilling applications may be managed by different entities, such as unique operators, contractors, owners, and the like. Thus, a first activity for a sub-process may be directed by a first application and managed by a first entity, whereas a second activity for the sub-process may be directed by a second application managed by a second entity. According to one or more embodiments, the rig computing system may toggle between utilizing the various drilling applications. Further, in one or more embodiment, drilling data generated while a particular entity is controlling an activity may be partitioned into a separate storage from drilling data generated while another entity is controlling an activity. The separate storage may be, for example, a separate physical storage device, a storage partition in a physical storage device, or a different data structure on a storage device. Thus, ownership of an activity may be managed for example, based on depth, formation, or section of a well plan.

The rig operating system 308 may include multiple components or layers that are utilized to translate tool-agnostic well plans into tool-specific instructions to direct downhole tools 302 to implement the well plan. In one or more embodiments, the rig operating system 308 may include a service layer 310, an activity layer 312, and a set of controller modules 314. In one or more embodiments, the service layer 310 may coordinate with a tool-agnostic request to an activity layer. The service layer may identify one or more activities required to complete a requested service or sub-process. As an example, the service layer 310 may receive instructions from a drilling application with instructions to perform a drill function to a particular depth, or in a particular formation. The service layer 310 may manage the activities needed to perform the different sub-process functions required to achieve the objective from a current drilling state. In one or more embodiments, the service layer 310 may switch between processes or objectives manually based on user input, or dynamically based on a predefined well plan or other instructions provided by detection module 306 or well program 304. Further, in one or more embodiments, the process may be dynamically modified based on a model or algorithm input. For example, the service layer 310 may switch the process objective from drilling to tripping or to reaming based on the input.

The service layer 310 may coordinate with the activity layer 312 to manage the various activities required to complete the requested sub-process or service. The activity layer may coordinate with one or more controller modules 314 to implement a particular activity. As an example, the activity layer 312 may identify various controller modules required to implement an activity as directed by the service layer 310. Further, according to one or more embodiments, the activity layer 312 may determine whether one or more controller modules 314 are available for performing a necessary activity. In one or more embodiments, if a controller module 314 is not available, then the activity layer 312 may trigger a notification such that the particular activity may be driven by a user.

According to one or more embodiments, the controller modules 314 act as an abstraction layer that allows applications to be tool-agnostic, and controller module 314 to translate the instructions for specific downhole tools 302 or other drilling components. In one or more embodiments, controller modules 314 may include state machine logic to start and stop downhole tools 302 and other components, and bridge the process to the machine. The controller modules 314 may translate tool-agnostic instructions into tool-specific instructions based on the specific downhole tools 302 or other components available on a rig, thereby driving the tools. In one or more embodiments, the controller modules 314 may be tool-specific. That is, a controller module may be associated with a particular tool or tools such that the controller module generates tool-specific instructions for that particular tool. Further, in one or more embodiments, the controller modules 314 may be associated with multiple tools or components, or may be associated with a particular function of a particular tool.

According to one or more embodiments, the service layer 310 may manage the scheduling of the various sub-processes by the activity layer 312 and the controller modules 314. For example, the service layer may determine a current drilling state and, based on the drilling state, trigger the activity layer 312, and thus the controller modules 314 to perform an action. For example, if the objective is to drill, the controller modules 314 may initiate pumps to prepare for a particular flow, initiate a top drive for a particular circulation, and the like.

Drilling data may be determined based on sensor data from sensors 132. The drilling data may include contextual data either from or determined by the sensors 132, or environmental contextual data, such as drilling depth. According to one or more embodiments, the hookload measurements may be determined based on sensor data from sensors 132.

Figure 4:
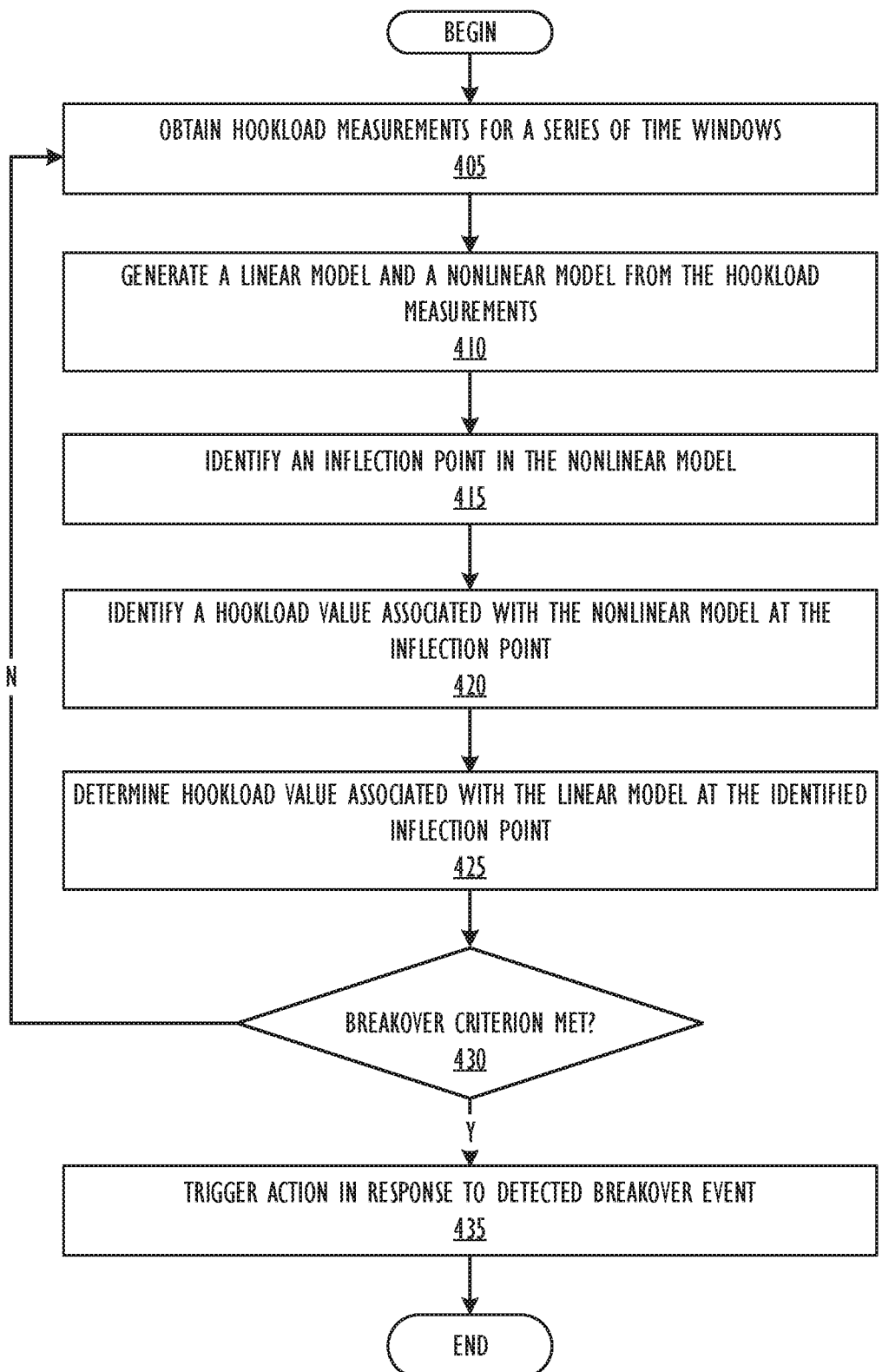
FIG. 4 is a flowchart illustrating a technique for automatically detecting a breakover event.

FIG. 4 is a flowchart illustrating dynamically detecting that a break over event has occurred during a friction test. According to one or more embodiments, the rig computing system 200 may utilize machine learning to better identify that a breakover event has occurred. Although the flow chart includes a particular series of processes, according to one or more embodiments, the various processes may be performed in an alternative order, or one or more processes may be performed concurrently, or may be omitted.

The flowchart begins at 405, where the detection module obtains hookload measurements for a series of time windows. As described above, the time windows may each be associated with a representative hookload measurement. The hookload measurement indicates a total weight on the hook at a given time. According to more embodiments, the length of the time window may be predetermined, or may be configured by a user. For each time window, a representative hookload measurement may be obtained. The representative hookload measurement may be a maximum hookload measurement determined during the time window. Alternatively, the representative for close measurement may be an average hookload measurement determined during a time window, or the like.

The flowchart continues at 410, where the detection module generates a linear model and a nonlinear model from the hookload measurements. According to one or more embodiments, the linear model and the nonlinear model may be updated after each time window, after a particular number of time windows, or the like.

As the hookload measurements are obtained for the various time windows, the hookload measurements may be considered against time. With respect to the linear model, the hookload measurements from time zero up to a current time may be fit to a linear model. The slope of the linear model may be used to compare hookload values over time to detect when a breakover event took place, that normally happens when the curve of hookload vs time has achieved a stable horizontal trend after a peak followed by a slight decline hookload. To improve the determination of stability, a nonlinear model may also be utilized. That is, the hookload measurements from time zero up to the current time may also be fit to a nonlinear model. According to one or more embodiments, the nonlinear model may give additional information about the hookload measurements, for example by considering an inflection point of the nonlinear model, which may indicate a change in the direction of the nonlinear model. For purposes of this description, the inflection point refers to a point in time at which the curve of the nonlinear model is determined to change direction. As such, the nonlinear model may have an increasing trend until the inflection point, at which time the nonlinear model begins a downward trend.

According to one or more embodiments, various nonlinear models may be utilized.

The form of the model is that of an S-shaped curve. The nonlinear model may assume that the hookload data starts with a flat horizontal profile in the initial time windows, and then increases its slope significantly to attain a stable configuration again. As an example, a piecewise linear regression model may be utilized, as well as a least-squares model, a polynomial regression model, or a logistic regression model. One particular example of a logistic regression model which may be utilized is known as a dose-response curve (DRC). The DRC has its origins in the medical domain, specifically in clinical pharmacology. Typically, a DRC is a graph that relates what is known as a "stressor" to the response of an organism consuming that stressor.

The flowchart continues at 415, where the detection module identifies an inflection point in the nonlinear model. The inflection point is associated with a point in time at which the curve of the nonlinear model changes direction. At 420, the detection module identifies a hookload value associated with the nonlinear model at the inflection point. That is, the curve of the nonlinear model may be analyzed at the inflection point to determine the corresponding hookload value.

At 425, the detection module determines the hookload value associated with the linear model at the identified inflection point. As described above, the inflection point may be associated with a point in time at which the curve of the nonlinear model changes direction. The value determined at 425 is based on the same point in time, but referencing a hookload value from the linear model at that time.

The flowchart continues at 430, and the detection module determines whether a breakover criterion is met. The breakover criterion may be based on the identified hookload value associated with the nonlinear model at the inflection point, and the determined hookload value associated with the linear model at the inflection point. According to one or more embodiments, the breakover criterion may be satisfied when the hookload value associated with the linear model exceeds the hookload value associated with the nonlinear model at the inflection point of the nonlinear model. Said another way, when the linear model crosses the inflection point below the hookload value from the nonlinear model, the stable region is determined to not yet been reached. In contrast, when the linear model crosses the inflection point above the hookload value of the nonlinear model, the breakover criterion is determined to have been met, and a breakover event is determined to be detected. If at 430, the breakover criterion is determined to not be met, then the flowchart returns to 405 and the detection module continues to obtain hookload measurements for the series of time windows.

The flowchart concludes at 435 in response to a determination that the breakover criterion is met at 430. At 435, the detection module triggers an action response to the detected breakover event. According to one embodiment, the detected breakover event may trigger a notification, for example to a driller or another module in the rig computing system. As an example, the detection module may present a notification to a driller that the breakover event has just occurred. As another example, the detection module may trigger an additional drilling process in response to the detection.

Figure 5A:
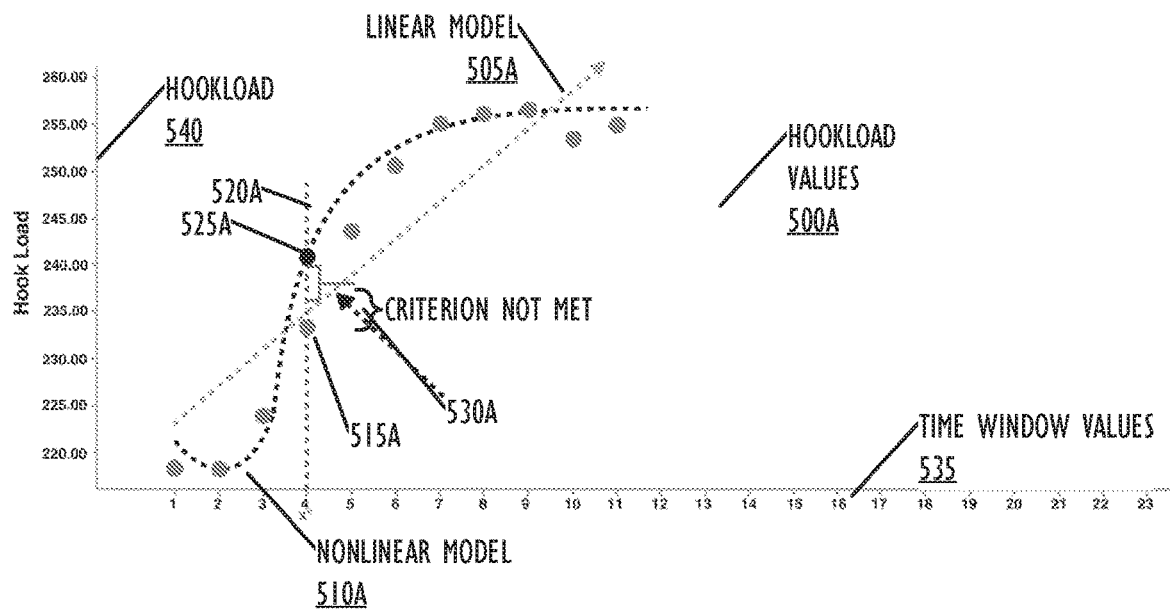
FIGS. 5A-5B depict example hookload measurements over time which are monitored for a breakover event.

FIG. 5A shows an example hookload measurement data 500 that has been captured over 12 time windows. As described above, the hookload values 540 are determined against the series of time window values 535. It should be understood that the hookload measurements depicted are intended merely as an example of one or more embodiments of the invention, and is presented for explanatory purposes.

As described above, the hookload measurements may be fit to a linear model 505A and a nonlinear model 510A. Inflection point 525A represents the inflection point of the nonlinear model 510A, and in particular indicates a time value 520A at which the inflection point is found. As depicted, at the time value associated with the inflection point 525A, a hookload value associated with the nonlinear model 510A exceeds a hookload value associated with the linear model 530A. As such, the breakover criteria in may be determined to not be met.

Figure 5B:
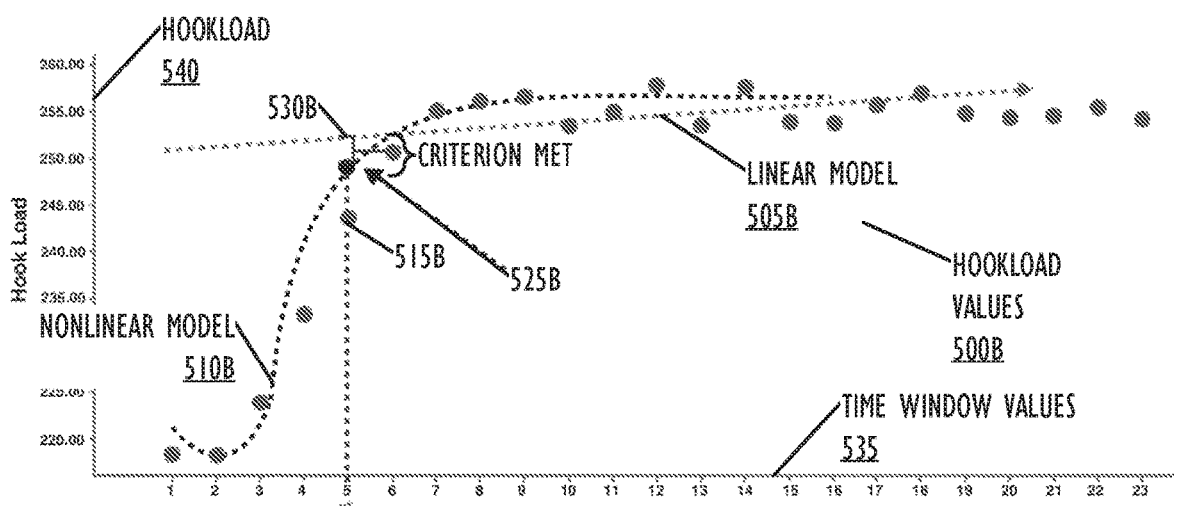

FIG. 5B depicts the hookload values 500B after additional hookload values have been obtained for subsequent time windows. As such, FIG. 5B depicts a set of hookload values after hookload values 500A for which a breakover criterion was met. As such, hookload values may have continued to be obtained for additional time windows. Accordingly, a hookload value has been obtained for time window 23. It should be understood that the hookload measurements depicted are intended merely as an example of one or more embodiments of the invention, and is presented for explanatory purposes.

As shown, as additional hookload values are obtained for subsequent time windows, the linear model and the nonlinear model may change. Thus, the linear model 505B has a much less steep slope than linear model 505A. In addition, nonlinear model 510B may be refined and extended as additional hookload values are obtained for subsequent time windows as compared to nonlinear model 510A.

With respect to the hookload values 500B, an inflection point for nonlinear model 510B may be identified at time window 5 corresponding to observed hookload value 515B. Because the linear model 505B and the nonlinear model 510B have been updated to reflect the newly observed hookload values for time windows 1-23, new hookload values associated with the linear and nonlinear models are determined. As such, the hookload value associated with the nonlinear model 510B at the inflection point is shown at 525B, while the hookload value associated with the linear model at the inflection point is depicted as 530B. Because the hookload value associated with the linear model 505B at the inflection point 530B exceeds the hookload value 525B associated with the nonlinear model at the inflection point, the breakover criterion is determined to be met. As such, the detection module detects the breakover event after the observation of hookload measurement data for time window 23. At that time, the detection module determines that a breakover event occurred at a time window corresponding to the inflection point. As such, in the depicted example, a breakover event is determined to have occurred at time window 5.

Figure 6:
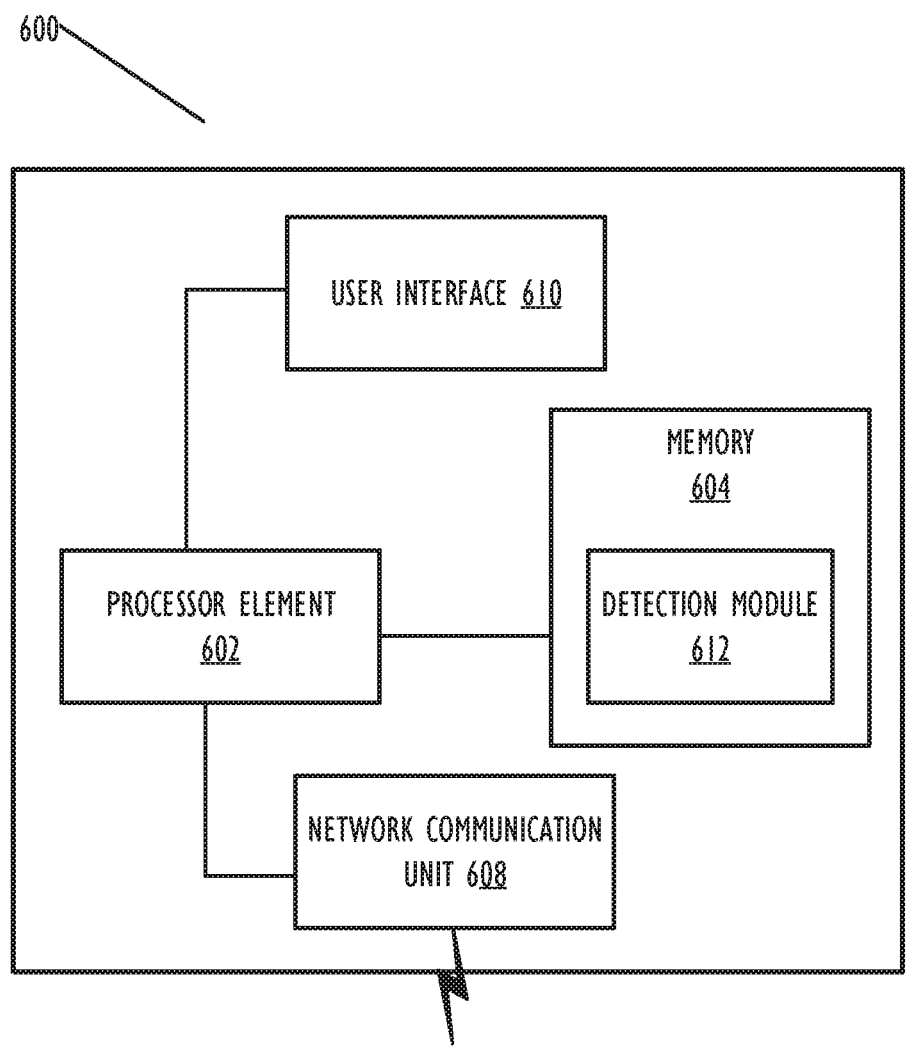
FIG. 6 is a block diagram illustrating a rig computing device for use with techniques described herein according to another embodiment.

FIG. 6 illustrates a particular computing device 600, that may be more example, a different view of rig computing device 200. Computing device 600 may include a memory 604 that may be operatively coupled to processing element 602. Memory 604 may be a non-transitory medium configured to store various types of data. For example, memory 604 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tape drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processing element 602. In one embodiment, the compiling process of the software program may transform program code written in a programming language to another computer language such that the processing element 602 is able to execute the programming code. For example, the compiling process of the software program may generate an executable program that provides encoded instructions (e.g., machine code instructions) for processor 602 to accomplish specific, non-generic, particular computing functions.

After the compiling process, the encoded instructions may then be loaded as computer executable instructions or process steps to processing element 602 from storage (e.g., memory 604) and/or embedded within the processing element 602 (e.g., cache). Processing element 602 can execute the stored instructions or process steps, such as those related to detection module 612, in order to perform instructions or process steps to transform the computing device into a non-generic, particular, specially programmed machine or apparatus. Stored data, e.g., data stored by a storage device, can be accessed by processing element 602 during the execution of computer executable instructions or process steps to instruct one or more components within the computing device 600.

A user interface 610 can include a display, positional input device (such as a mouse, touchpad, touchscreen, or the like), keyboard, or other forms of user input and output devices. The user interface 610 can be coupled to processor element 602. Other output devices that permit a user to program or otherwise use the computing device can be provided in addition to or as an alternative to network communication unit 608. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 600 may comprise other components well known in the art, such as sensors, powers sources, and/or analog-to-digital converters, not explicitly shown in FIG. 6.

The programmable devices depicted in FIG. 6 is a schematic illustration of embodiments of programmable devices which may be utilized to implement various embodiments discussed herein. Various components of the programmable devices depicted in FIG. 6 may be combined in a system-on-a-chip (SoC) architecture.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore be determined with reference to the appended claims, along with the full scope of equivalents to which such claims are entitled.

What is claimed is:

1. A method for detecting a breakover event, comprising, during a friction test:
    obtaining, for each of a plurality of time windows, a hookload measurement;
    generating a linear model and a nonlinear model from the plurality of hookload measurements;
    identifying an inflection point in the nonlinear model;
    determining a first hookload value associated with the linear model at a time value associated with inflection point;

determining a second hookload value associated with the nonlinear model at the inflection point; and in response to determining that the first hookload value exceeds the second hookload value, determining that a breakover event has occurred.

2. The method of claim 1, wherein the nonlinear model comprises a dose-response curve.

3. The method of claim 1, wherein the hookload measurement is obtained based on one or more sensors on a rig.

4. The method of claim 1, further comprising:
in response to determining that a breakover event has occurred, generating a notification.

5. The method of claim 1, further comprising:
in response to determining that a breakover event has occurred, automatically triggering a drilling activity.

6. The method of claim 1, wherein the length of the plurality of each time window is configurable by a user.

7. The method of claim 1, wherein the nonlinear model is selected from a group consisting of a polynomial regression model, a logistic regression model, a piece-wise linear regression model and a Least Squares model.

8. A non-transitory computer readable medium comprising computer readable code for detecting a breakover event, the computer readable code executable by one or more processors to:
obtain, during a friction test, for each of a plurality of time windows, a hookload measurement to obtain a plurality of hookload measurements;
generate a linear model and a nonlinear model from the plurality of hookload measurements;
identify an inflection point in the nonlinear model;
determine a first hookload value associated with the linear model at a time value associated with inflection point;
determine a second hookload value associated with the nonlinear model at the inflection point; and
in response to determining that the first hookload value exceeds the second hookload value, determine that a breakover event has occurred.

9. The non-transitory computer readable medium of claim 8, wherein the nonlinear model comprises a dose-response curve.

10. The non-transitory computer readable medium of claim 8, wherein the hookload measurement is obtained based on one or more sensors on a rig.

11. The non-transitory computer readable medium of claim 8, further comprising computer readable code to, in response to determining that a breakover event has occurred, generate a notification.

12. The non-transitory computer readable medium of claim 8, further comprising computer readable code to, in response to determining that a breakover event has occurred, automatically trigger a drilling activity.

13. The non-transitory computer readable medium of claim 8, wherein the length of the plurality of each time window is configurable by a user.

14. The non-transitory computer readable medium of claim 8, wherein the nonlinear model is selected from a group consisting of a polynomial regression model, a logistic regression model, a piece-wise linear regression model and a Least Squares model.

15. A system for detecting a breakover event comprising:
one or more processors;
one or more memory devices coupled to the one or more processors and comprising computer readable code executable by the one or more processors to:
obtain, during a friction test, for each of a plurality of time windows, a hookload measurement to obtain a plurality of hookload measurements;
generate a linear model and a nonlinear model from the plurality of hookload measurements;
identify an inflection point in the nonlinear model;
determine a first hookload value associated with the linear model at a time value associated with inflection point;
determine a second hookload value associated with the nonlinear model at the inflection point; and
in response to determining that the first hookload value exceeds the second hookload value, determining that a breakover event has occurred.

16. The system of claim 15, wherein the nonlinear model comprises a dose-response curve.

17. The system of claim 15, wherein the hookload measurement is obtained based on one or more sensors on a rig.

18. The system of claim 15, further comprising computer readable code to, in response to determining that a breakover event has occurred, generate a notification.

19. The system of claim 15, further comprising computer readable code to, in response to determining that a breakover event has occurred, automatically trigger a drilling activity.

20. The system of claim 15, wherein the length of the plurality of each time window is configurable by a user.

* * * * *